UNITED STATES PATENT OFFICE.

ALEXANDER SCHWARCMAN, OF BUFFALO, NEW YORK, ASSIGNOR TO SPENCER KELLOGG & SONS, INC., OF BUFFALO, NEW YORK, A CORPORATION OF NEW YORK.

MANUFACTURE OF CATALYSTS.

1,111,502.    Specification of Letters Patent.    Patented Sept. 22, 1914.

No Drawing.    Application filed February 4, 1914.    Serial No. 816,512.

*To all whom it may concern:*

Be it known that I, ALEXANDER SCHWARCMAN, a citizen of the United States, residing at Buffalo, in the county of Erie and State of New York, have invented certain new and useful Improvements in the Manufacture of Catalysts, of which the following is a specification.

This invention relates to the manufacture of catalysts; and it comprises a method of making an active catalyst wherein a precipitated hydrated sesquioxid is treated with a soluble salt of a platinum group metal, advantageously palladium, until a certain amount of reactive platinum group compound is deposited therein by double decomposition or adsorption or both; the treated sesquioxid is then dried at a comparatively low temperature, best after thorough washing; the hydrated sesquioxid being advantageously formed under conditions permitting adsorption or absorption thereby of colloid organic matter, such organic matter being advantageously a solution of keratin dissolved in caustic alkali, such as wool or horn dissolved in soda; and it also comprises as a new catalyst, a comparatively fine-grained hydrated sesquioxid carrying incorporated platinum group compounds, and, advantageously, also a certain proportion of an organic colloid, this catalyst, having a crystalline or pseudocrystalline appearance under the microscope and being easily filtered from liquids in which it is suspended and as easily washed; and the sesquioxid used being advantageously alumina; all as more fully hereinafter set forth and as claimed.

In the hydrogenation of oils to convert them into harder fats by the well known reaction in which such an oil, as for example cottonseed oil, is treated with hydrogen in the presence of a catalyst, there are a number of important details in successful operation. Generally the catalyst is nickel or nickel oxid, both of which have a number of disadvantages. The more active the nickel or nickel oxid is as a catalyzer the more active it is chemically and it is difficult to prevent the formation of nickel soaps; or to remove the nickel soap from the oil after its formation. This fact has limited the use of nickel with edible oils and fats. Another difficulty is that to obtain a highly reactive material it must be excessively fine; so fine as almost to produce a colloidal or dispersoid solution. Naturally, it is difficult to remove the catalyst in such a form from such a solution or suspension after the reaction is complete; this being quite apart from any difficulty incident to the formation of nickel soaps. It acts, in a way, like a difficultly separable slime.

Palladium although a more expensive material is more reactive than nickel. With nickel, temperatures from 300° F. to 480° F. are required for hydrogenation and these temperatures are detrimental to the quality of oil and fat. The temperatures required for hydrogenation with palladium are much lower; temperatures below 212° F. or just above the melting point of the final fatty material being generally employed. Palladium does not form soaps. This metal therefore has important point of advantage over nickel. But as usually employed it is either in the form of a colloid solution or as a palladium salt. Occasionally, it has been proposed to use palladium on a carrier, such as kieselguhr; but for various reasons these propositions have not been highly successful in practice. One reason is that with most carriers the palladium is not fixedly retained in place, palladium and its salts having an unusually strong tendency to slime off as "colloidal solutions." Occasionally the carrier has been also used as a precipitant of the palladium; as by using a highly basic body to throw the palladium out of solution and also act as a carrier for the precipitated oxid. But of course these basic bodies, like magnesia, are also bodies which have a strong tendency to form soaps with fats; and particularly where the oil or fat is somewhat acid, as is usually the case. And with these carriers, as well as the more inert siliceous materials, such as kieselguhr, more commonly employed, there is a tendency for finer material, quite apart from the sliming of the palladium itself, to be formed. Kieselguhr, fullers' earth, calcium carbonate, etc., all tend to "slime off" in oil.

Finely divided palladium is even more difficult to remove from the finished material than is the nickel catalyst. A complete removal however is absolutely necessary, not only because its presence spoils the appearance of the fat but because palladium is a very expensive material. Its removal however by any filtration is even more difficult than that of the nickel catalysts.

Many propositions have been made looking toward the solution of the difficulty of removing the catalyst from treated oils by changing its physical state; by flocculating the colloid in suspension, as by use of electricity, by acids, etc. But these have not worked well; and most chemicals capable of changing the physical state of the catalyst change its chemical state as well; i. e., impair the activity of the recovered material. Filtration with the aid of adsorbent clarifying powders like fullers' earth is hardly feasible in the case of palladium which is expensive and difficult to recover. Furthermore, upon the physical form of the catalyst depends much of the ease and quickness of hydrogenation. Both the nickel catalyst and the palladium catalyst are relatively heavy materials which tend to "mud down" in the bottom of the treating apparatus. For hydrogenation it is indispensably necessary that the gaseous hydrogen, the liquid oil and the solid catalyst be, as nearly as possible, in simultaneous contact; and settling of the catalyst to the bottom of the apparatus during the operation is not permissible. This necessitates stirring.

As will be seen, not only is it necessary to have the catalyst in a highly reactive form, (and particularly so in the case of palladium because of its expense) but it is necessary to use it in a form which will permit its removal from the oil and its easy recovery by a simple and cheap filtration process without the use of clarifying powders like fullers' earth. And this form must permit stirring or agitation without sliming. The use of a carrier is practically necessary with any catalytic metal to lighten the specific gravity and admit an easy suspension while increasing the active surface. With palladium this necessity is even more apparent in view of the excessively minute quantities of material which can be used in treating a given amount of oil; there must be a certain amount of bulk given it.

I have found that by producing a deposit of compounds of platinum group metals on the hydrated sesquioxids, best in a particular way, I can produce a catalyst which has a number of important advantages. The sesquioxid may be ferric hydrate, chromium hydrate or aluminum hydrate. Other hydrated non-basic or slightly acid oxids, such as hydrated tin oxid, titanic acid, tungstic acid, etc., may be used but have no particular advantage over the sesquioxids. Hydrated oxids of the type of cobalt oxid, nickel oxid, zinc oxid, etc., may be used for some purposes within the purview of my invention but for general hydrogenation work are far inferior to the sesquioxids. In case the catalyst is to be used for oxidation, and particularly where the active oxygen carriers, osmium and platinum are employed, these other oxids in hydrated form, and particularly manganese oxid, lead oxid and cobalt oxids, have distinct advantages. But as stated for hydrogenation work I find the sesquioxids best adapted; and particularly with palladium as the catalyst. The best results have been given me by aluminum hydrate, but the other two sesquioxids may be used. I shall therefore hereinafter speak more specifically of hydrated alumina, it being understood that the other two may be used in its lieu. Palladium is the best metal of the platinum group to use for the purpose of hydrogenating although platinum compounds may be used for this purpose, and for oxidizing are even better. Osmium, ruthenium, and rhodium may be used for special purposes; but for hydrogenating oils are not better than palladium.

Other things being equal the activity of these catalytic platinum group metals is about proportional to their surface since gases do not penetrate the metal very far in the rapid work of hydrogenation. For efficient work therefore the metal should be as finely subdivided as possible; a fact which explains the use of colloidal solutions of the metals in the art. Colloidal solutions however have the stated disadvantages and it is an object of the present invention to obtain an equal state of subdivision while obviating these disadvantages and securing new advantages. In the present invention a highly active material is provided carrying only a fraction of a per cent. of palladium or the like evenly distributed through the oxid carrier in an adsorbed condition.

The hydrated sesquioxids although not active as hydrogenating agents per se appear to heighten the activity of palladium and the like, acting in some degree as "co-catalysts". This is particularly true with palladium hydroxid distributed through hydrated alumina. Anhydrous alumina as a carrier affects the activity of palladium but little if at all, and does not heighten it. These hydrated oxids are all readily soluble in dilute acids, which is very convenient in regenerating the catalyst whenever deemed necessary. But it may be noted at this point that a catalyst of palladium carried by hydrated alumina produced by the method hereinafter described appears to be of indefinitely long life; it seems to preserve its activity to the full even after having been used very many times. The sesquioxids have the further advantage that they are not sufficiently basic to form soaps with the fats, therein having an advantage over more basic oxids such as zinc oxid, magnesia, etc. They are of comparatively low specific gravity and, with proper operation, the platinum group metal compound can be uniformly distributed through them, giving a comparatively bulky catalyst of great homogeneity. And although ordinarily these hydrated sesquioxids rank as materials which are difficult to filter and separate from liquids, I find that these catalysts in oil, and particularly with the material made as hereinafter described, are very easy to filter and to separate. They settle out cleanly when the agitation of the oil is discontinued but during agitation they can be readily distributed throughout and held in suspension in its mass, thereby making easy the stated three-fold contact of gas, liquid and solid. I find that for some reason the presence of a small amount of an organic colloid body in the catalyst-holding sesquioxid is of advantage. The best colloid for this purpose which I have used, may be obtained by dissolving a suitable keratinous material, such as wool, in caustic soda and then using this caustic soda for the precipitation of the alumina which is to form the carrier. Wool I find is the best although hide, leather, horn, silk, etc., may be used.

In a good embodiment of my invention I may dissolve 342 parts of aluminum sulfate $(Al_2(SO_4)_3)$ in 3400 parts of water and adjust the temperature to about 170° F. Any other soluble aluminum salt such as the nitrate, chlorid, etc., may be used. I then add a solution of 240 parts of commercial caustic soda or the equivalent amount of carbonate, in 1000 parts of water at about the same temperature. Ammonia or potash may be used but soda is satisfactory. The temperatures and proportions and the strengths of solution may be varied but those indicated give good results. The addition of the soda results in the precipitation of hydrated alumina. This precipitate is washed by decantation, or in any other suitable way until all the soluble salts have been removed. The wash water may be tested with barium chlorid, where aluminum sulfate is used, to ascertain the extent of the removal of soluble matters. The hydrate so obtained is next treated to incorporate palladium if palladium is the platinum group metal used. For this purpose, 0.312 parts of palladium chlorid may be dissolved in 100 parts of water and the hydrated alumina treated therewith. More or less palladium may be used but the quantity indicated makes a good catalyst for general purposes. Palladium chlorid is preferable to the nitrate. The mixture may then be brought to a boil, filtered and the solid material washed. Operating cold is less advantageous. This treatment leaves the alumina charged with merely the quantity of palladium it will adsorb. The material after washing is next dried at a temperature which should not be too high. A high temperature is apt to cause dehydration of the palladium oxid, and of the alumina as well, to an extent here undesired. A drying temperature between 150 to 170–180° F. is suitable. About 170° is best. Using the amounts of materials indicated, there will be obtained about 156 parts of highly active catalyst containing approximately 0.2 per cent. palladium. Generally most of this palladium exists in the catalyst in the form of a hydrate. While the palladium may be reduced by hydrogen, formaldehyde, etc., after being so incorporated in the carrier, I find the material made as described is best. Chromium sulfate and ferric sulfate in stoichiometric proportions may be substituted for sulfate of alumina in the above example.

Using alumina in the manner just described the product is a fine grained brown powder, with particles having no tendency to stick together and forming an ideal filtering bed. The color is due to the platinum metal compound. The granules are very fine but exhibit no tendency to slime or to lose palladium even on long and violent agitation.

When used with oil the catalyst settles out cleanly and completely and it exhibits no tendency to adhere to the pores of filters. Under the microscope the granules exhibit a peculiar crystalline or pseudocrystalline appearance. Their physical properties are excellent for the purpose of hydrogenating oil. In addition the catalyst exhibits a very high degree of activity. I find that one per cent. of this catalyst in hydrogenation is sufficient to harden unsaturated fats or oils within a short period. The oil treated may be any of the common vegetable or animal oils, such as cottonseed oil, sesame oil, peanut oil, olive oil, lard oil, train oil, fish oil, etc. Using the catalyst with the oil in any suitable apparatus provided with suitable stirring means and allowing hydrogen to act, either at ordinary or high pressure, hard products may be obtained in from 5 to 8 hours, the particular time depending upon the consistency desired. It is desirable to operate as near 200° F. as possible during the hydrogenation.

A still more active catalyst in a somewhat different physical form is obtained by using a little keratin or other organic colloid dissolved in the caustic soda used for forming the hydrated alumina. Wool is very well suited. The same reagents in the same proportions may be used together in the manner indicated above with the exception that, say, about 5 parts of wool, or the like, may be previously dissolved in the caustic soda solution. The final material obtained is more fluffy and bulky than where the wool, etc., is omitted. This fluffy bulky catalyst is kept in suspension in the oil with particular readiness and offers great advantages during the hydrogenation. It also settles out readily and cleanly on discontinuing stirring and gassing; and forms an admirable filter bed, filtering the treated oil quickly while giving a sparking filtrate free from palladium. Wool gives particularly good results and is readily dissolved in the caustic soda used in making the sesquioxid. Other organic colloids than keratin (horny substance) may be employed, as for example, various gums, carbohydrates, etc.; but the wool gives particularly advantageous results.

While in the specific example hereinbefore given, I have described adding a solution of palladium chlorid, or the like, to the alumina, washing and then drying, and while I regard this as preferable, yet the alumina hydrate may be simply sprayed or otherwise mixed with a little of the solution and then directly dried, the washing being omitted. With the minimal amount of palladium or other chlorid or nitrate used, and particularly in the case of the nitrate, the small amount of solubles then remaining does no particular harm. But I usually wash after the treatment with the compound of the platinum group metal.

With a catalyst of the described character a complete recovery of palladium may be effected after each operation; and the treated oil is free of palladium.

Alumina hydrate obtained by precipitation as above described I find better for the present purposes than hydrated alumina made by direct oxidation of the metal; as in treating aluminum amalgam with water, etc. However, alumina so made may be treated with palladium chlorid as described.

As palladium oxid does not form soaps with the fatty acids, it may be employed in hydrogenating free oily and fatty acids. Reactive nickel, which always contains oxid, and nickel oxid cannot be employed for this purpose. And as alumina and other sesquioxids are insoluble in fatty acids, the palladium carried by a sesquioxid makes a particularly good catalyst for the present purposes.

What I claim is:—

1. In the manufacture of a catalyst, the process which comprises forming a hydrated sesquioxid, treating with a solution of a compound of a platinum group metal such solution containing a relatively small amount of metal, and drying.

2. In the manufacture of a catalyst, the process which comprises forming hydrated alumina, treating with a solution of a compound of a platinum group metal such solution containing a relatively small amount of metal, and drying.

3. In the manufacture of a catalyst, the process which comprises forming a hydrated sesquioxid, treating with a solution containing the amount of a palladium compound which the sesquioxid will absorb, and drying.

4. In the manufacture of a catalyst, the process which comprises forming hydrated alumina, treating with a solution containing the amount of a palladium compound which the alumina will absorb, and drying.

5. The process of forming a catalyst which comprises precipitating a solution of a sesquioxid compound with alkali, washing the precipitate free of soluble matters, treating with a solution of a compound of a platinum group metal such solution containing a relatively small amount of metal, and drying.

6. The process of forming a catalyst which comprises precipitating a solution of an alumina salt with alkali, washing the precipitate free of soluble matters, treating with a solution of a compound of a platinum group metal such solution containing a relatively small amount of metal, and drying.

7. The process of forming a catalyst which comprises precipitating a solution of an alumina salt with alkali, washing the precipitate free of soluble matters, treating with a solution containing the amount of a palladium compound which the precipitate will absorb, and drying.

8. The process of producing a catalyst which comprises treating a solution of a salt of a sesquioxid with an alkali carrying organic colloid matter in solution, washing the precipitate, treating the same with a solution of a salt of a platinum group metal, washing and drying.

9. The process of producing a catalyst which comprises treating a solution of a salt of a sesquioxid with an alkali solution in which wool has been dissolved, washing the precipitate, treating the same with a solution of a palladium compound, washing and drying.

10. The process of preparing a catalyst which comprises treating a hydrated oxid with a solution of a compound of the platinum group, separating the liquid from the treated oxid and drying the oxid.

11. The process of preparing a catalyst which comprises treating a hydrated oxid with a solution of a palladium compound, separating the liquid from the treated oxid and drying the oxid.

12. As a new composition of matter, a highly reactive catalyst comprising a hydrated sesquioxid and an adsorbed material comprising a relatively small amount of a platinum group metal distributed therethrough, such catalyst being in the form of a fine highly reactive brown powder, readily distributed through oil and settling cleanly therefrom.

13. As a new composition of matter, a highly reactive catalyst comprising a hydrated sesquioxid and an adsorbed material comprising a relatively small amount of a palladium compound distributed therethrough, such catalyst being in the form of a fine highly reactive brown powder, readily distributed through oil and settling cleanly therefrom.

14. As a new article, a catalyst comprising a dry hydrated oxid having incorporated and adsorbed therein a material comprising a relatively small amount of a platinum group metal.

15. As a new article, a catalyst comprising a dry hydrated oxid having incorporated therein an adsorbed material comprising palladium.

16. As a catalyst, a dry hydrated sesquioxid containing an organic colloid and a compound of a platinum group metal.

17. As a catalyst, a dry hydrated sesquioxid containing an organic colloid and a compound of palladium.

18. As a catalyst, a dry hydrated alumina containing an organic colloid and a compound of palladium.

19. As a catalyst, a dry hydrated alumina containing the colloid matters of wool and a compound of palladium.

In testimony whereof, I affix my signature in the presence of two subscribing witnesses.

ALEXANDER SCHWARCMAN.

Witnesses:
 JOHN H. SIGGERS,
 K. P. MCELROY.